United States Patent
Chen (10) Patent No.: US 10,051,192 B1
(45) Date of Patent: Aug. 14, 2018

(54) SYSTEM AND APPARATUS FOR ADJUSTING LUMINANCE LEVELS OF MULTIPLE CHANNELS OF PANORAMIC VIDEO SIGNALS

(71) Applicant: Scott Zhihao Chen, Irvine, CA (US)

(72) Inventor: Scott Zhihao Chen, Irvine, CA (US)

(*) Notice: Subject to any disclaimer, the term of this patent is extended or adjusted under 35 U.S.C. 154(b) by 130 days.

(21) Appl. No.: 15/173,654

(22) Filed: Jun. 5, 2016

(51) Int. Cl.
| | |
|---|---|
| *G06T 5/40* | (2006.01) |
| *H04N 5/235* | (2006.01) |
| *H04N 5/232* | (2006.01) |
| *H04N 5/247* | (2006.01) |
| *H04N 9/73* | (2006.01) |
| *H04N 9/77* | (2006.01) |
| *H04N 9/64* | (2006.01) |

(52) U.S. Cl.
CPC ......... *H04N 5/2352* (2013.01); *H04N 5/2351* (2013.01); *H04N 5/23238* (2013.01); *H04N 5/247* (2013.01); *H04N 9/646* (2013.01); *H04N 9/735* (2013.01); *H04N 9/77* (2013.01)

(58) Field of Classification Search
CPC .............................. H04N 21/44008; G06T 5/40
USPC ....................................................... 348/38, 36
See application file for complete search history.

(56) References Cited

U.S. PATENT DOCUMENTS

| | | | | |
|---|---|---|---|---|
| 8,169,488 | B2* | 5/2012 | Fujiyama | H04N 5/23238 348/208.3 |
| 2006/0268180 | A1* | 11/2006 | Chou | G06T 5/009 348/673 |
| 2007/0291185 | A1* | 12/2007 | Gelb | H04N 9/3147 348/745 |
| 2014/0240512 | A1* | 8/2014 | Hogasten | H04N 5/2257 348/164 |
| 2014/0375699 | A1* | 12/2014 | Park | G09G 3/3225 345/690 |
| 2015/0334315 | A1* | 11/2015 | Teich | H04N 5/2257 348/164 |
| 2015/0358560 | A1* | 12/2015 | Boulanger | H04N 5/332 348/164 |
| 2017/0078590 | A1* | 3/2017 | Hogasten | H04N 5/2257 |
| 2017/0094212 | A1* | 3/2017 | Ko | G06K 9/4661 |
| 2017/0244875 | A1* | 8/2017 | Kwak | G09G 5/00 |

* cited by examiner

*Primary Examiner* — Paulos M Natnael (57) ABSTRACT

Panoramic imaging system and process for adjusting luminance levels of a set of video signals captured by a set of cameras in the panoramic imaging system is disclosed. In some embodiments, the disclosed panoramic imaging system includes a housing, the set of cameras and an integrated circuit (IC) chip coupled to the set of cameras and configured to adjust luminance levels of a set of video signals captured by the set of cameras, thereby enabling the set of cameras to capture the set of video signals having substantially the same luminance level. The panoramic imaging system further includes an image processor coupled to the IC chip and configured to receive the set of video signals having substantially the same luminance level and to post-process the set of video signals.

11 Claims, 7 Drawing Sheets

SYSTEM AND APPARATUS FOR ADJUSTING LUMINANCE LEVELS OF MULTIPLE CHANNELS OF PANORAMIC VIDEO SIGNALS

TECHNICAL FIELD

The present disclosure generally relates to the field of panoramic imaging, and more specifically to the systems and techniques for adjusting the luminance levels of a set of video signals captured by a set of cameras in a panoramic imaging system.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images and stitch the images together as a single panoramic image.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Currently, main-stream panoramic imaging solutions can be generally categorized into the multi-lens approach and the single-lens approach. Multi-lens panoramic camera systems utilize a set of cameras for simultaneous image or video capturing. The cameras are typically arranged in either a parallel fashion or a converged fashion, such that each camera's field of view overlaps with that of at least one other camera. This way, the total field of view covered by the multi-camera systems is significantly enlarged as compared to a conventional single-lens camera. Hence, during panoramic video capturing, a multi-camera panoramic system generates multiple channels of simultaneous video signals, which are immediately output from the multiple cameras and transmitted to a processor, such as an accelerated processing unit (APU) of the multi-camera panoramic system for post-processing.

When using a multi-camera panoramic imaging system to capture multiple video signals, what can happen is that lighting conditions for the different cameras are not uniform, which can result in differences in luminance for the different channels of the video signals. This situation can subsequently lead to non-uniformities in luminance within a panoramic image generated by stitching together the multiple channels of camera images having different luminance levels. Conventional techniques address the problem of non-uniformities in luminance associated with the stitched panoramic images by post-processing the stitched images after the multi-channel of cameras images have been stitched together.

SUMMARY

Described herein are systems and techniques for adjusting luminance levels of a set of video signals captured by a set of cameras in a panoramic imaging system. The proposed systems and techniques provide a solution for resolving non-uniformities in luminance within a composite panoramic image generated by stitching multiple camera images having different luminance levels. In various embodiments, a proposed system includes two or more cameras for capturing a set of video signals and a field-programmable gate array (FPGA) coupled to the two or more cameras for processing the set of video signals captured by the two or more cameras and adjusting the operating settings of the two or more cameras, thereby enabling the set of cameras to capture a set of video signals having substantially the same luminance level. The proposed systems and techniques provide a solution to resolve non-uniformities in luminance within composite panoramic images prior to constructing the composite panoramic images and thereby avoiding post-processing the panoramic images on a separate computer after the multi-channel camera images have been stitched together.

In one aspect, a panoramic imaging system capable of adjusting luminance levels of a set of video signals captured by a set of cameras in the panoramic imaging system is disclosed. This panoramic imaging system includes a housing, the set of cameras and an integrated circuit (IC) chip coupled to the set of cameras and configured to adjust luminance levels of a set of video signals captured by the set of cameras, thereby enabling the set of cameras to capture the set of video signals having substantially the same luminance level. The panoramic imaging system further includes an image processor coupled to the IC chip and configured to receive the set of video signals having substantially the same luminance level and to post-process the set of video signals. In some embodiments, post-processing the set of video signals using the image processor includes stitching a set of video images captured by the set of cameras and having substantially the same luminance level to construct a composite panoramic video image.

In some implementations, the IC chip includes: an input interface configured to receive a set of video images captured by the set of cameras; a set of luminance statistics modules coupled to the input interface and configured to generate a set of luminance histograms corresponding to the set of video images; an analysis module coupled to the set of luminance statistics modules and configured to generate a set of adjustment parameters indicative of operating settings of the set of cameras; a luminance uniformity adjustment module coupled to the analysis module and configured to process the adjustment parameters to generate a set of control parameters for adjusting the operating settings of the set of cameras; and a set of luminance control modules coupled to the luminance uniformity adjustment module and configured to use the set of control parameters to adjust the operating settings of the set of cameras, thereby enabling the set of cameras to capture a set of video signals having substantially the same luminance level.

In some implementations, the input interface is coupled to the set of cameras through a parallel YUV data path.

In some implementations, the set of luminance control modules is coupled to the set of cameras through an $I^2C$ bus.

In some implementations, the set of luminance control modules is implemented as an $I^2C$ master controller.

In some implementations, the IC chip includes a field-programmable gate array (FPGA).

In some implementations, the image processor includes an accelerated processing unit (APU).

In another aspect, an integrated circuit (IC) chip implemented on a panoramic imaging system for adjusting luminance levels of a set of video signals captured by a set of cameras in the panoramic imaging system is disclosed. This IC chip includes: an input interface configured to receive a set of video images captured by the set of cameras; a set of luminance statistics modules coupled to the input interface and configured to generate a set of luminance histograms corresponding to the set of video images; an analysis module coupled to the set of luminance statistics modules and configured to generate a set of adjustment parameters indicative of operating settings of the set of cameras; a luminance uniformity adjustment module coupled to the analysis module and configured to process the adjustment parameters to generate a set of control parameters for adjusting the operating settings of the set of cameras; and a set of luminance control modules coupled to the luminance uniformity adjustment module and configured to use the set of control parameters to adjust the operating settings of the set of cameras, thereby enabling the set of cameras to capture a set of video signals having substantially the same luminance level.

In some implementations, the set of luminance control modules is configured to adjust the operating settings of the set of cameras by increasing the sensor gain for a camera in the set of cameras determined to have a lower lighting condition than other cameras in the set of cameras or decreasing the sensor gain for a camera in the set of cameras determined to have a higher lighting condition than other cameras in the set of cameras. In some embodiments, the operating settings include at least an exposure value.

In some implementations, the IC chip further includes an output interface configured to output the set of video signals having substantially the same luminance level to an image processor in the panoramic imaging system for post-processing. In some embodiments, the IC chip includes a field-programmable gate array (FPGA).

In yet another aspect, a process for adjusting luminance levels of a set of video signals captured by a set of cameras in a panoramic imaging system is disclosed. This process includes some or all of the following steps: receiving a set of video images captured by the set of cameras; generating a set of luminance histograms corresponding to the set of video images; analyzing the set of luminance histograms to generate a set of adjustment parameters indicative of operating settings of the set of cameras; generating a set of control parameters for adjusting the operating settings of the set of cameras based at least on the set of adjustment parameters; and using the set of control parameters to adjust the operating settings of the set of cameras, thereby enabling the set of cameras to capture a set of video signals having substantially the same luminance level.

In some implementations, the process analyzes the set of luminance histograms to generate an overall luminance level for each of the received set of video images.

In some implementations, the set of control parameters includes at least a sensor gain.

In some implementations, the set of control parameters includes a sensor gain and a white balance value.

In some implementations, the process adjusting the operating settings of the set of cameras by increasing the sensor gain for a camera in the set of cameras determined to have a lower lighting condition than other cameras in the set of cameras or decreasing the sensor gain for a camera in the set of cameras determined to have a higher lighting condition than other cameras in the set of cameras.

In some implementations, the process further includes transmitting the set of video signals having substantially the same luminance level to a panoramic image processor for post-processing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Described herein are systems and techniques for adjusting luminance levels of a set of video signals captured by a set of cameras in a panoramic imaging system. The proposed systems and techniques provide a solution for resolving non-uniformities in luminance within a composite panoramic image generated by stitching multiple camera images having different luminance levels. In various embodiments, a proposed system includes two or more cameras for capturing a set of video signals and a field-programmable gate array (FPGA) coupled to the two or more cameras for processing the set of video signals captured by the two or more cameras and adjusting the operating settings of the two or more cameras, thereby enabling the set of cameras to capture a set of video signals having substantially the same luminance level. The proposed systems and techniques provide a solution to resolve non-uniformities in luminance within composite panoramic images prior to constructing the composite panoramic images and thereby avoiding post-processing the panoramic images on a separate computer after the multi-channel camera images have been stitched together.

In one aspect, a panoramic imaging system capable of adjusting luminance levels of a set of video signals captured by a set of cameras in the panoramic imaging system is disclosed. This panoramic imaging system includes a housing, the set of cameras and an integrated circuit (IC) chip coupled to the set of cameras and configured to adjust luminance levels of a set of video signals captured by the set of cameras, thereby enabling the set of cameras to capture the set of video signals having substantially the same luminance level. The panoramic imaging system further includes an image processor coupled to the IC chip and configured to receive the set of video signals having substantially the same luminance level and to post-process the set of video signals. In some embodiments, post-processing the set of video signals using the image processor includes stitching a set of video images captured by the set of cameras and having substantially the same luminance level to construct a composite panoramic video image.

In another aspect, an integrated circuit (IC) chip implemented on a panoramic imaging system for adjusting luminance levels of a set of video signals captured by a set of cameras in the panoramic imaging system is disclosed. This IC chip includes: an input interface configured to receive a set of video images captured by the set of cameras; a set of luminance statistics modules coupled to the input interface and configured to generate a set of luminance histograms corresponding to the set of video images; an analysis module coupled to the set of luminance statistics modules and configured to generate a set of adjustment parameters indicative of operating settings of the set of cameras; a luminance uniformity adjustment module coupled to the analysis module and configured to process the adjustment parameters to generate a set of control parameters for adjusting the operating settings of the set of cameras; and a set of luminance control modules coupled to the luminance uniformity adjustment module and configured to use the set of control parameters to adjust the operating settings of the set of cameras, thereby enabling the set of cameras to capture a set of video signals having substantially the same luminance level.

In yet another aspect, a process for adjusting luminance levels of a set of video signals captured by a set of cameras in a panoramic imaging system is disclosed. This process includes some or all of the following steps: receiving a set of video images captured by the set of cameras; generating a set of luminance histograms corresponding to the set of video images; analyzing the set of luminance histograms to generate a set of adjustment parameters indicative of operating settings of the set of cameras; generating a set of control parameters for adjusting the operating settings of the set of cameras based at least on the set of adjustment parameters; and using the set of control parameters to adjust the operating settings of the set of cameras, thereby enabling the set of cameras to capture a set of video signals having substantially the same luminance level.

Figure 1:
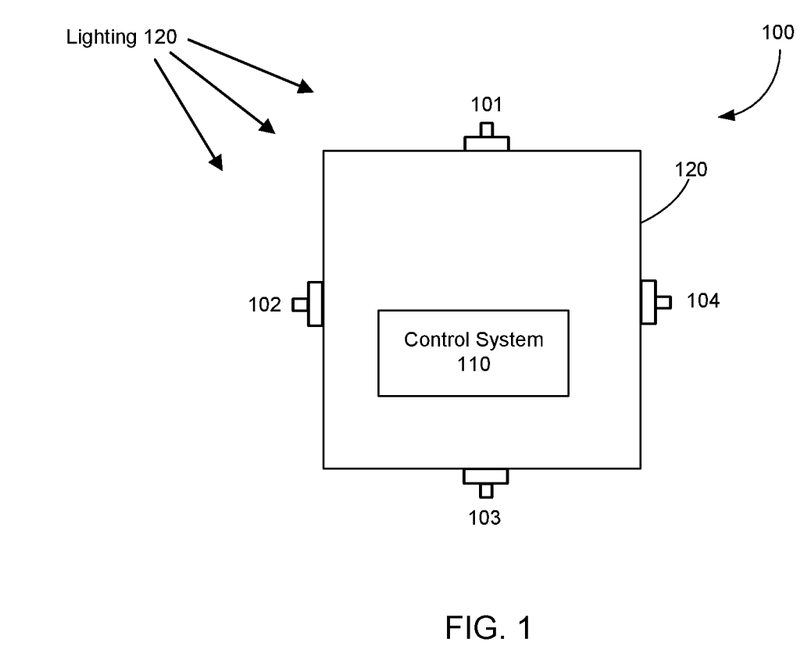
FIG. 1 is a schematic top view of an example panoramic imaging system in accordance with some embodiments described herein.

FIG. 1 is a schematic top view of an example panoramic imaging system in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes four cameras 101-104, a control system 110, and housing 120. Each of four cameras 101-104 may be a digital camera. In some aspects, each of cameras 101-104 may include a wide-angle lens (e.g., fisheye lens) to capture image data. The horizontal angle of view of a wide-angle lens may be greater than 180 degrees and the vertical angle of view of a wide-angle lens may be greater than 180 degrees. FIG. 1 shows cameras 101-104 are distributed evenly across on a frame of housing 120, for example, on four sides of the frame having a rectangular shape. Each of cameras 101-104 may face a ⅛ of a 360° field. It can be appreciated that cameras 101-104 may be distributed in any other arrangement and each of cameras 101-104 may face any portion of a 360° field. Furthermore, panoramic imaging system 100 may include a greater or a fewer number of cameras than the four cameras shown in FIG. 1. For example, panoramic imaging system 100 may include 2, 3, 6, 8, 10, or 12 cameras.

The control system 110 may include one or more electronic circuitries, such as a system on chip (SOC) with a field-programmable gate array (FPGA), Accelerated Processing Unit (APU) and peripheral electronic circuitries, for processing the image data captured by cameras 101-104 to produce wide to entire 360° panoramas, including both still images and movies. It can now be appreciated that outputs of panoramic imaging system 100 may be panoramas stitched from a set of original images captured by cameras 101-104.

When panoramic imaging system 100 is used to capture multiple channels of video images using cameras 101-104, lighting conditions for the different cameras may be non-uniform. For example, FIG. 1 illustrates lighting 120 incident on panoramic imaging system 100 from the upper left so that cameras 101 and 102 receive more lighting 120 than camera 103 and 104 do. As a result, the two channels of video signals captured by cameras 101 and 102 may have a higher luminance level than the other two channels of video signals captured by cameras 103 and 104. Without compensating for such non-uniform lighting conditions can lead to non-uniformities in luminance within a panoramic image generated by stitching together the multiple channels of camera images. In various embodiments, control system 110 is configured to process the multiple channels of video images captured by cameras 101-104 and output multiple channels of adjusted video images of substantially the same luminance. Notably, the above luminance adjustment operations are performed on the raw video signals prior to using the processed raw video signals to construct panoramic images. In some embodiments, the luminance adjustment functions of the control system 110 are implemented on and performed by a field-programmable gate array (FPGA) or one or more application specific integrated circuits (ASICs).

Cameras 101-104 and the control system 110 may be enclosed in housing 120, such as a protective housing to reduce environmental effects on the components. In some embodiments, the protective housing is waterproof, dust-proof, shockproof, freeze-proof, or any combination thereof. In some aspects, housing 120 may include one or more mechanical parts for mounting, housing and/or moving the cameras 101-104 and/or other optical components. Furthermore, in some embodiments, cameras 101-104 can be reversibly coupled to or detached from the remaining system, such that an end user may select different models of cameras 101-104 to be used with panoramic imaging system 100 according to particular needs or preferences.

It can be appreciated that a variety of embodiments of cameras 101-104 may be employed. These embodiments may have different numbers and/or arrangements of cameras than cameras 101-104, but a common feature may be that each camera's field of view overlaps with that of at least one other camera, thereby enabling panoramic imaging system 100 to capture a total field of view according to the design.

Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
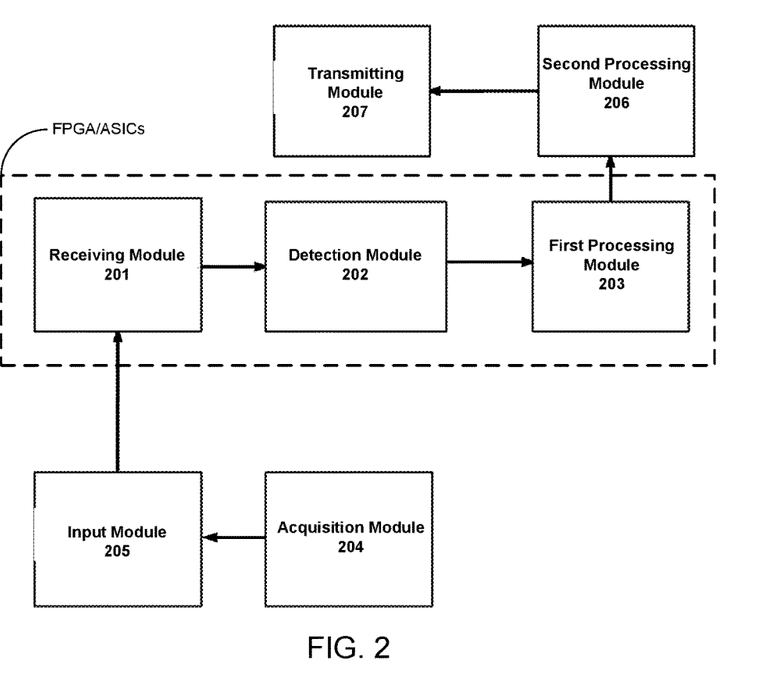
FIG. 2 illustrates a block diagram of an exemplary implementation of the panoramic imaging system described in FIG. 1 in accordance with some embodiments described herein.

FIG. 2 illustrates a block diagram of an exemplary implementation of the panoramic imaging system 100 described in FIG. 1 in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 2, panoramic imaging system 100 includes receiving module 201, detection module 202, first processing module 203, acquisition module 204, input module 205, second processing module 206, and transmitting module 207.

Receiving module 201 may receive image or video data captured by the multiple cameras 101-104 in a YUV format. Detection module 202 may detect a signal format of the received image or video data by receiving module 201. The signal format of the image or video data may include resolution, pixel clock, line frequency information, and/or field frequency information. First processing module 203 may process the detected image or video data, e.g., including, but not limited to adjusting the luminance levels of multiple channels of image or video signals captured by cameras 101-104, and the processed image or video signals can be sent to second processing module 206 for further processing. First processing module 203 may also output the detected image or video data to a memory unit (not shown in FIG. 2), such as a double date rate (DDR) memory unit.

The processing at second processing module 206 may include projection and panoramic image stitching, or distortion correction to produce 360-degree panoramic image and/or video. Second processing module 206 may also include an encoding mechanism configured to encode the 360-degree panoramic image or video data using H.264 standard. Second processing module 206 may be implemented as an accelerated processing unit (APU), a CPU, a micro-controller or other types of microprocessors. In some embodiments, receiving module 201, detection module 202 and first processing module 203 may be collective implemented by an FPGA or one or more application specific integrated circuits (ASICs). Transmitting module 207 may transmit the processed image or video data from second processing module 206 to a client device.

Acquisition module 204 may capture panoramic image or video data, such as 360-degree panoramic image or video data, using a plurality of cameras, such as the set of cameras 101-104 shown in system 100 of FIG. 1. In some aspects, a horizontal angle of view of each of the plurality of cameras capturing the 360-degree panoramic image data is 360 degrees divided by the number of the plurality of cameras (e.g., N) and a vertical angle of view of each of the plurality of cameras capturing the 360-degree panoramic image or video data is 360 degree divided by the number of the plurality of cameras.

In some aspects, when N>6, each of the plurality of cameras may include a wide-angle lens; when N>8, each of the plurality of cameras may include a regular (e.g., narrow-angle) lens; and when N<=6, each of the plurality of cameras may include a fisheye lens. In some aspects, when N=>8, each of the plurality of cameras may include a regular (e.g., narrow-angle) lens to capture an image without distortion, therefore distortion correction may not be required. In some aspects, when N<=8, each of the plurality of cameras may include a fisheye lens, and distortion may exist in the captured image, therefore distortion correction may be required.

Input module 205 may receive the captured panoramic image or video data in a first data format, convert the first data format to a second data format, and output the panoramic image or video data in the second data format to a downstream FPGA. Input module 205 may also receive the captured panoramic image or video data in the second data format and output the panoramic image or video data in the second data format to a downstream FPGA.

Figure 3:
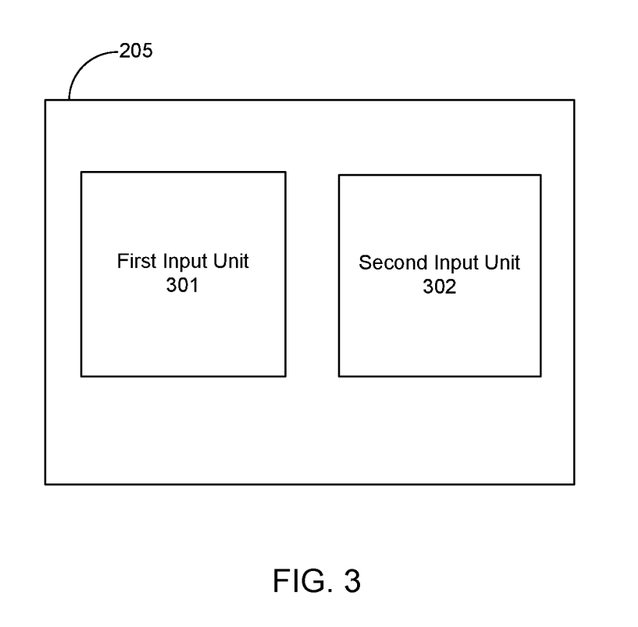
FIG. 3 illustrates a block diagram of an exemplary implementation of the input module in FIG. 2 in accordance with some embodiments described herein.

FIG. 3 illustrates a block diagram of an exemplary implementation of input module 205 in FIG. 2 in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 3, input module 205 may include first input unit 301, and second input unit 302. In some aspects, first input unit 301 may receive the panoramic image or video data from acquisition module 204 described in FIG. 2 in YUV data format and transmit the panoramic image or video data through a parallel YUV data interface to the FPGA. In some aspects, second input unit 302 may receive the panoramic image or video data from acquisition module 204 in MIPI data format and transmit the 360-degree panoramic image or video data through a MIPI data interface and output to the FPGA through an interface chip which converts the MIPI data format to a parallel YUV data format.

Figure 4:
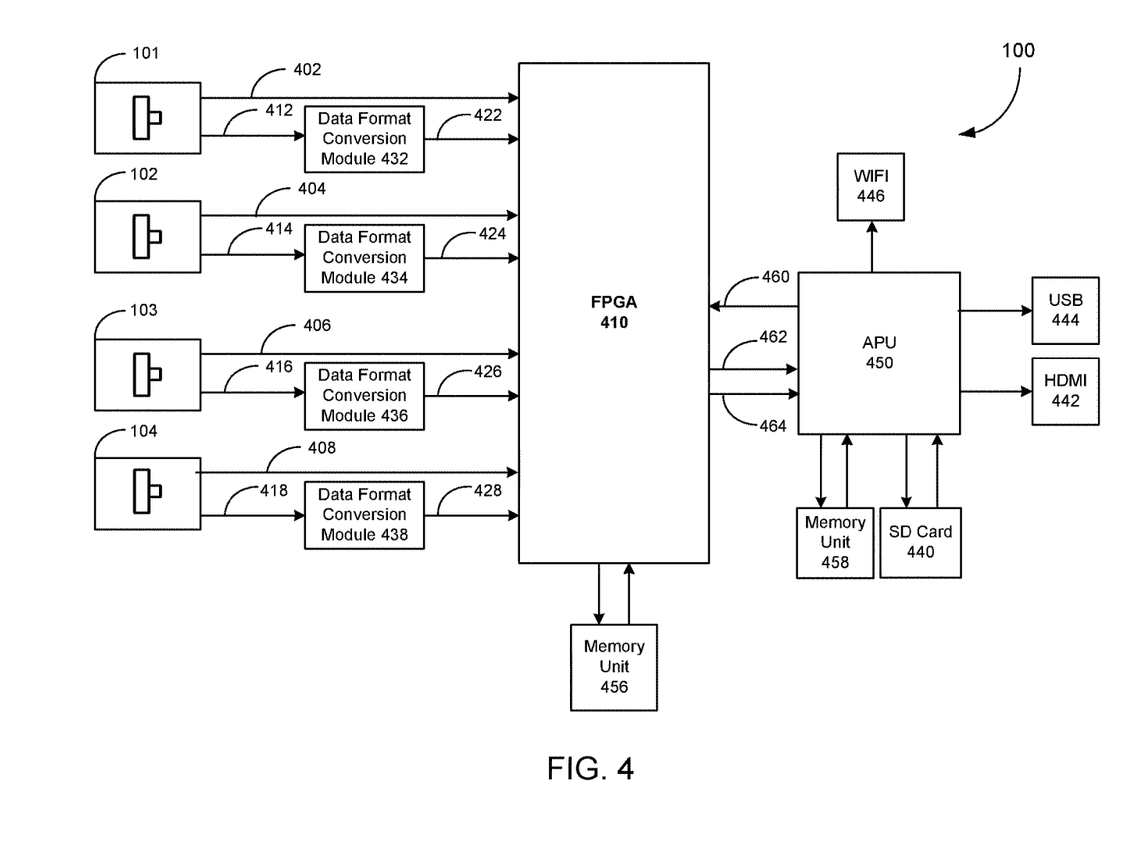
FIG. 4 illustrates a block diagram of an exemplary implementation of the panoramic imaging system in FIG. 1 which includes a FPGA configured to adjust the luminance levels of multiple channels of video signals captured by multiple cameras in accordance with some embodiments described herein.

FIG. 4 illustrates a block diagram of an exemplary implementation of the panoramic imaging system 100 which includes a FPGA configured to adjust the luminance levels of multiple channels of video signals captured by multiple cameras in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 4, panoramic imaging system 100 includes cameras 101, 102, 103 and 104, FPGA 410, APU 450, memory units 456 and 458, SD card 440, WIFI module 446, USB module 444, and HDMI module 442. In particular embodiments, FPGA 410 is configured to process the multiple channels of video images captured by cameras 101-104 and to generate adjustment parameters which are used to control the set of cameras by adjusting the exposure (for example, by adjustment the "sensor gain") and white balance parameters so that the video signals generated by the set of cameras can have substantially the same luminance level. FPGA 410 may also be configured to output multiple channels of adjusted video images of substantially the same luminance to APU 450. An exemplary implementation of FPGA 410 is provided below in conjunction with FIG. 5. As mentioned above, panoramic imaging system 100 may include a greater or a fewer (≥2) number of cameras than the four cameras shown in FIG. 4. For example, panoramic imaging system 100 may include 2, 3, 6, 8, 10, or 12 cameras.

In one or more implementations, one or more of cameras 101, 102, 103 and 104 may simultaneously establish connections with FPGA 410. As shown in FIG. 4, the output from each of the cameras 101-104 may be coupled to FPGA 410 using two different connection options. More specifically, the output of camera 101 may be coupled to FPGA 410 through a direct connection 402. Alternatively, the output of camera 101 may be coupled to FPGA 410 by a path comprising a first connection 412 between the output of camera 101 and a data conversion module 432 and a second connection 422 between data conversion module 432 and FPGA 410. Similarly, the output of camera 102 may be coupled to FPGA 410 through a direct connection 404. Alternatively, the output of camera 102 may be coupled to FPGA 410 by a path comprising a first connection 414 between the output of camera 102 and a data conversion module 434 and a second connection 424 between data conversion module 434 and FPGA 410. Similarly, the output of camera 103 may be coupled to FPGA 410 through a direct connection 406. Alternatively, the output of camera 103 may be coupled to FPGA 410 by a path comprising a first connection 416 between the output of camera 103 and a data conversion module 436 and a second connection 426 between data conversion module 436 and FPGA 410. Finally, the output of camera 104 may be coupled to FPGA 410 through a direct connection 408. Alternatively, the output of camera 104 may be coupled to FPGA 410 by a path comprising a first connection 418 between the output of camera 104 and a data conversion module 438 and a second connection 428 between data conversion module 438 and FPGA 410.

In some embodiments, each of the connections 402, 404, 406, and 408 includes a parallel YUV data connection. This connection option may be used when the output data from a given camera 101, 102, 103, or 104 is already in YUV data format. In some embodiments, each of the connections 422, 424, 426, and 428 includes a parallel YUV data connection, and each of the connections 412, 414, 416, and 418 includes a MIPI data connection. Moreover, each of the data conversion modules 432, 434, 436 and 438 is configured to convert an input data from MIPI data format to parallel YUV data format. This alternative connection option may be used when the output data from a given camera 101, 102, 103, or 104 is in MIPI data format.

In some embodiments, FPGA 410 is configured to receive the four channels of panoramic video signals captured by the set of cameras 101-104 as inputs, process the four channels of video signals to generate control parameters, and use the control parameters to adjust operating conditions of the set of cameras so that they capture a set of video signals having substantially the same luminance level. In the embodiment shown, FPGA 410 and the set of cameras 101-104 are also coupled via a control bus 470, which may be implemented as an $I^2C$ control bus. In some embodiments, FPGA 410 can adjust luminance levels of cameras 101-104 via control bus 470 using the generated control parameters. More specifically, each of the cameras 101-104 receives specific control parameters, which can be used to adjust settings for the camera sensors to obtain desired luminance in the capture images. In particular embodiments, FPGA 410 includes a set of sequentially coupled modules configured to perform the above luminance adjustment functions. This set of sequentially coupled modules can include: an input interface module configured to receive a set of (4) video images captured by the set of (4) cameras and a luminance statistics module coupled to the outputs of the input interface module and configured to perform histogram statistics on the luminance component of each image of the set of video images and generate a set of (4) luminance histograms corresponding to the set of video images.

The set of sequentially coupled modules can also include a luminance histogram analysis module coupled to the outputs of the luminance statistics module and configured to perform histogram analysis on the set of luminance histograms and to subsequently generate adjustment parameters for each of the set of (4) cameras. The set of sequentially coupled modules can additionally include a luminance uniformity adjustment module coupled to the output of the luminance histogram analysis module and configured to process the adjustment parameters and output the processed adjustment parameters to a downstream control module, such as an $I^2C$ master control module. The set of sequentially coupled modules can further include a luminance control module coupled to the outputs of the luminance uniformity adjustment module and configured to control the set of cameras by controlling the exposure (for example, by controlling the sensor gain) and white balance parameters of each of the set of cameras based on the processed adjustment parameters, thereby enabling the set of cameras to capture the multiple channels of video signals having substantially the same luminance level. In some embodiments, the luminance control module controls the set of cameras through an $I^2C$ bus which interconnects the luminance control module and the set of cameras.

As illustrated in FIG. 4, FPGA 410 may be connected to a memory unit 456, such as a DDR chip 456. In some implementations, FPGA 410 may execute instructions that are stored on FPGA 410 itself, such as on one or more integrated circuits within FPGA 410. In other implementations, FPGA 410 may execute instructions that are stored on memory unit 456. While the above discussion primarily refers to FPGA 410 that executes instructions, some implementations are performed by one or more integrated circuits, for example, application specific integrated circuits (ASICs). In some aspects, some implementations may be performed by one or more processors that execute instructions.

APU 450 may establish a connection 460 with FPGA 410. Connection 460 may include an I²C connection, to allow easy communication between components which reside on the same circuit board. FPGA 410 may establish one or more connections 462 and 464 with APU 450. Connections 462 and 464 may include one or more video data connections. In some embodiments, APU 450 includes only a single video input port and hence connections 462 and 464 become a signal connection. In other embodiments, APU 450 includes two video input ports and hence connections 462 and 464 can include two connections.

In some embodiments, panoramic imaging system 100 may transmit the processed panoramic image and video data from APU 450 to a downstream computing device (not shown) for storage and playback via a Universal Serial Bus (USB) interface 444, e.g., which can be a USB 3.0 interface. In some other embodiments, panoramic imaging system 100 may transmit the processed panoramic image and video data from APU 450 to the downstream computing device for playback via a High-Definition Multimedia Interface (HDMI). In some embodiments, panoramic imaging system 100 may output the processed panoramic image and video data from APU 450 to be stored in a SD card 440 on panoramic imaging system 100 or to a memory unit 458, such as a DDR chip but different from the DDR chip 456. Furthermore, panoramic imaging system 100 may transmit the processed panoramic image and video data from APU 450 to a wireless access point and a smart device through WIFI 446.

Figure 5:
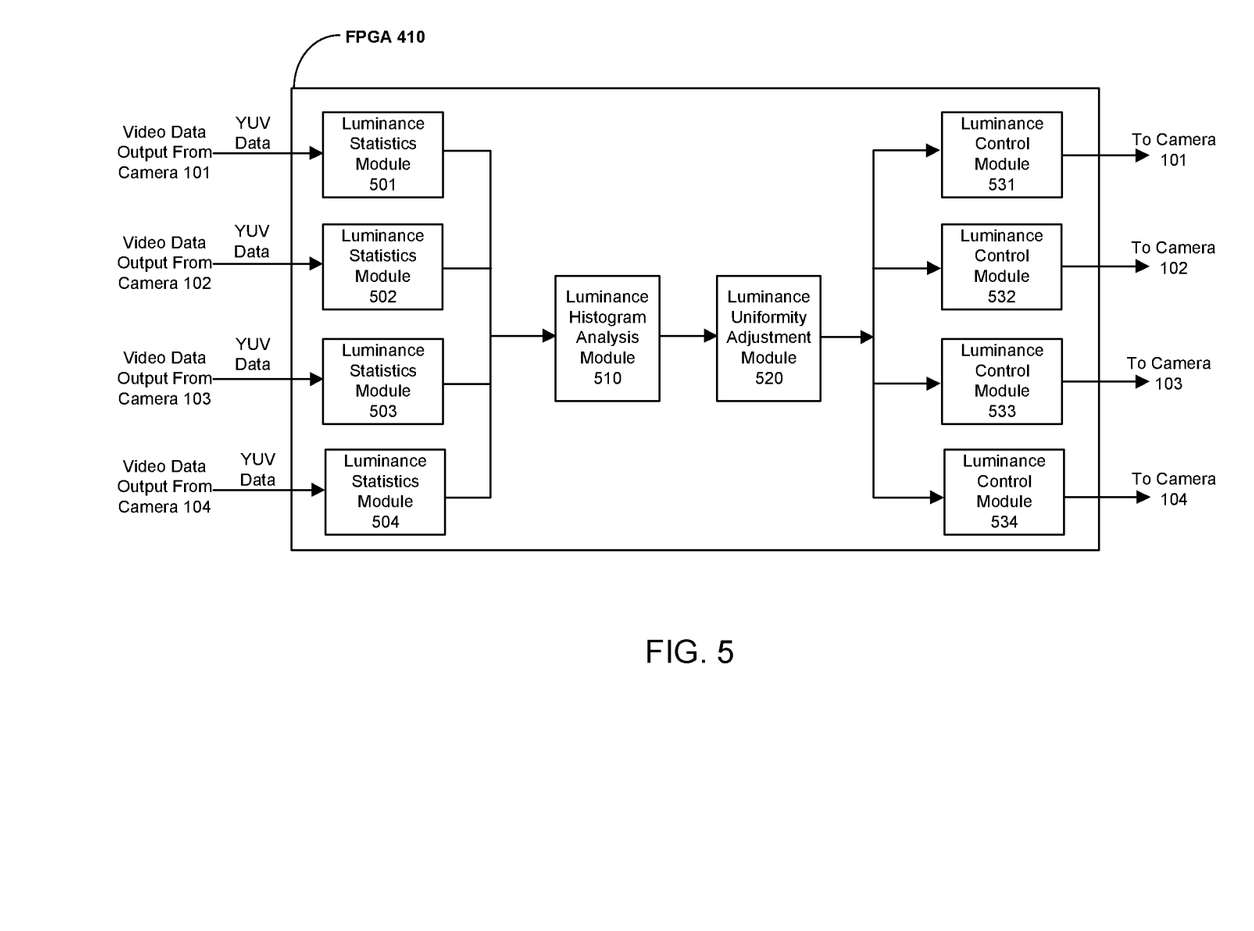
FIG. 5 illustrates a block diagram of an exemplary implementation of the FPGA configured to adjust the luminance levels of multiple channels of video signals in accordance with some embodiments described herein.

FIG. 5 illustrates a block diagram of an exemplary implementation of FPGA 410 described in FIG. 4 configured to adjust the luminance levels of multiple channels of video signals in accordance with some embodiments described herein. Not all of the depicted components shown in FIG. 5 may be used, however, and one or more implementations may include additional components not shown in the figure. Variations in the arrangement and type of the components may be made without departing from the scope of the subject technology. Additional components, different components, or fewer components may be provided.

As shown in FIG. 5, FPGA 410 includes a set of four luminance statistics modules 501-504 for receiving the four channels of video signals captured by four cameras 101-104, respectively. In the embodiment shown, the input video signal in each of the four channels is in parallel YUV data format as it is transmitted from the corresponding camera to the corresponding input on each of the set of luminance statistics modules 501-504. However, the input video signals can be in a data format other than the YUV data format. In some embodiments, each of the luminance statistics modules 501-504 includes an input cache/buffer operating as an input interface for FPGA 410 to receive the respective video signal. In some embodiments, FPGA 410 can include a set of separate input caches/buffers coupled between the cameras 101-104 and the luminance statistics modules 501-504 to serve as an input interface for FPGA 410 to receive the set of video signals. In some embodiments, each of the luminance statistics modules 501-504 is configured to perform histogram statistics on the luminance component of the respective received video image and generate a luminance histogram corresponding to the respective video images. As results, luminance statistics modules 501-504 generate and output four luminance histograms corresponding to the set of video images captured by the set of cameras. Note that while the exemplary embodiment illustrates four parallel luminance statistics modules 501-504, luminance statistics modules 501-504 can also be implemented as a single luminance statistics module without departing from the scope of the disclosed techniques.

Further referring to FIG. 5, FPGA 410 also includes a luminance histogram analysis module 510 coupled to the outputs of luminance statistics modules 501-504 to receive the four luminance histograms. In some embodiments, luminance histogram analysis module 510 is configured to perform histogram analysis on the set of luminance histograms and subsequently generate a set of adjustment parameters which are indicative of the operating settings of the set of cameras. For example, the set of adjustment parameters can include a separate luminance level for each of the set of cameras. In one embodiment, after obtaining the individual luminance levels for the set of cameras, an average luminance level for the set of cameras can then be computed based on the individual luminance levels, for example, by computing an average of the individual luminance levels.

As shown in FIG. 5, FPGA 410 also includes a luminance uniformity adjustment module 520 coupled to the output of luminance histogram analysis module 510. In some embodiments, luminance uniformity adjustment module is configured to process the adjustment parameters generated by luminance histogram analysis module 510 and generate processed adjustment parameters which can be used to adjust the operating settings of the set of cameras to allow the set of cameras to capture multiple channels of video signals having substantially the same luminance level. For example, under the example lighting condition shown of FIG. 1, processing the adjustment parameters may determine the luminance levels in the video signals captured by cameras 101 and 102 are higher than the luminance levels in the video signals captured by cameras 103 and 104, and the processed adjustment parameters may include higher exposure values (for example, by increasing the sensor gains) for cameras 103 and 104, or lower exposure values (for example, by decreasing the sensor gains) for cameras 101 and 102, or a combination thereof. In one embodiment, the processed adjustment parameters may include a separate global exposure/gain for each of the set of cameras. The separate global exposures/gains may be determined based on an average luminance level of the individual luminance levels for the set of cameras generated by the luminance histogram analysis. Hence, the set of global exposures/gains can be used to reset the exposure settings (e.g., the sensor gains) for the set of cameras so that the luminance levels of the captured images by the set of cameras can be substantially the same. In addition to a global exposure/gain, the processed adjustment parameters can also include one or more of the following parameters for adjusting the camera sensors: an analog gain, a digital gain, a red gain, a green gain, and a blue gain.

Also shown in FIG. 5, FPGA 410 additionally includes a set of luminance control modules 531-534 coupled to the output of the luminance uniformity adjustment module 520 to receive the respective processed adjustment parameters, wherein the output of each of the luminance control modules 531-534 is further coupled to a respective camera in the set of cameras 101-104 through a control bus, such as an I²C bus. In some embodiments, each of the set of luminance control modules 531-534 is configured to control a respective camera 101-104 by adjusting the associated exposure/sensor gain and white balance parameters of the camera based on the associated processed adjustment parameters, thereby enabling the set of cameras 101-104 to capture the multiple channels of video images having substantially the same luminance level.

Figure 6:
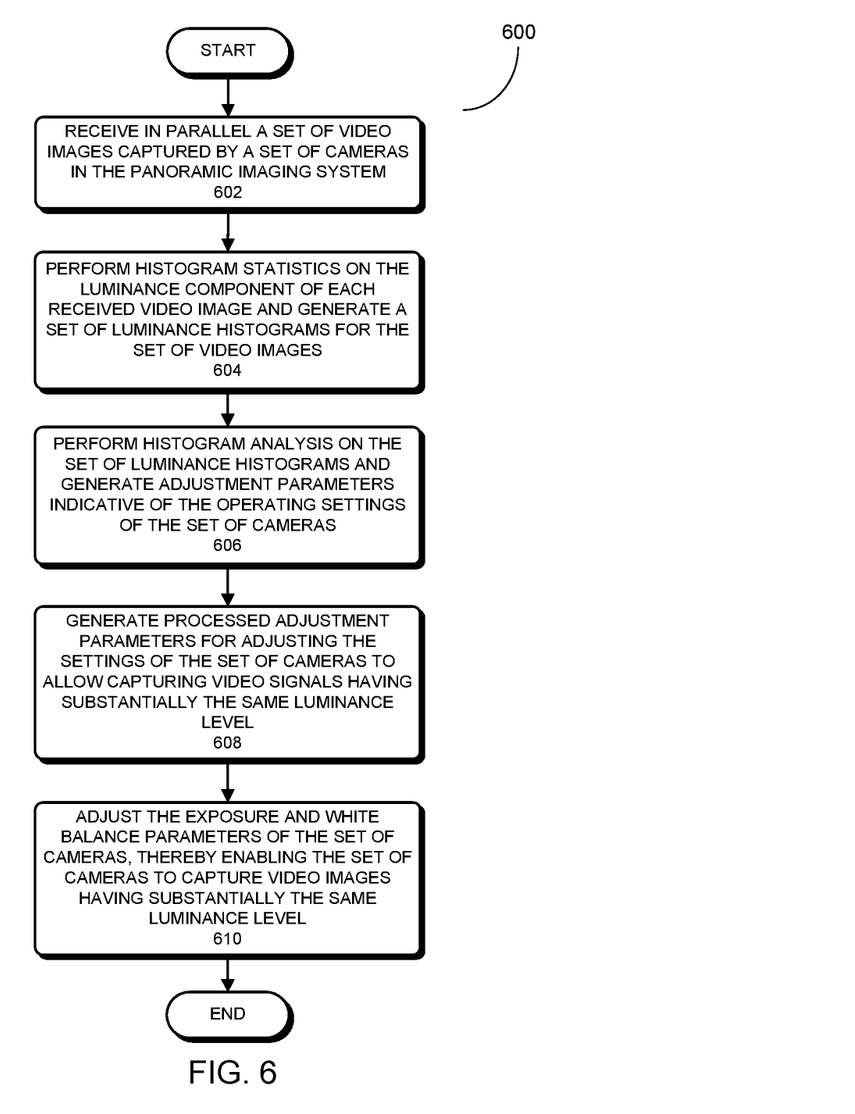
FIG. 6 presents a flowchart illustrating a process of adjusting the luminance levels of multiple channels of video signals captured by multiple cameras using the proposed technique in accordance with some embodiments described herein.

FIG. 6 presents a flowchart illustrating a process 600 of adjusting the luminance levels of multiple channels of video signals captured by multiple cameras using the proposed technique in accordance with some embodiments described herein.

The process begins by receiving in parallel a set of video images captured by a set of cameras in the panoramic imaging system (step 602). In some embodiments, the set of received video images can have non-uniform luminance levels as a result of non-uniform light conditions for the set of cameras. The process next performs histogram statistics on the luminance component of each received video image and generates a set of luminance histograms corresponding to the set of video images (step 604). Next, the process performs histogram analysis on the set of luminance histograms and subsequently generates a set of adjustment parameters which are indicative of the operating settings of the set of cameras (step 606). In some embodiments, the set of adjustment parameters can include an overall luminance level associated with each of the set of cameras. The process next processes the adjustment parameters and generates processed adjustment parameters for adjusting the operating settings of the set of cameras to allow the set of cameras to capture multiple channels of video signals having substantially the same luminance level (step 608). Next, the process uses the respective processed adjustment parameters to adjust the respective exposure and white balance parameters of the respective cameras, thereby enabling the set of cameras to capture the multiple channels of video images having substantially the same luminance level (step 610).

Figure 7:
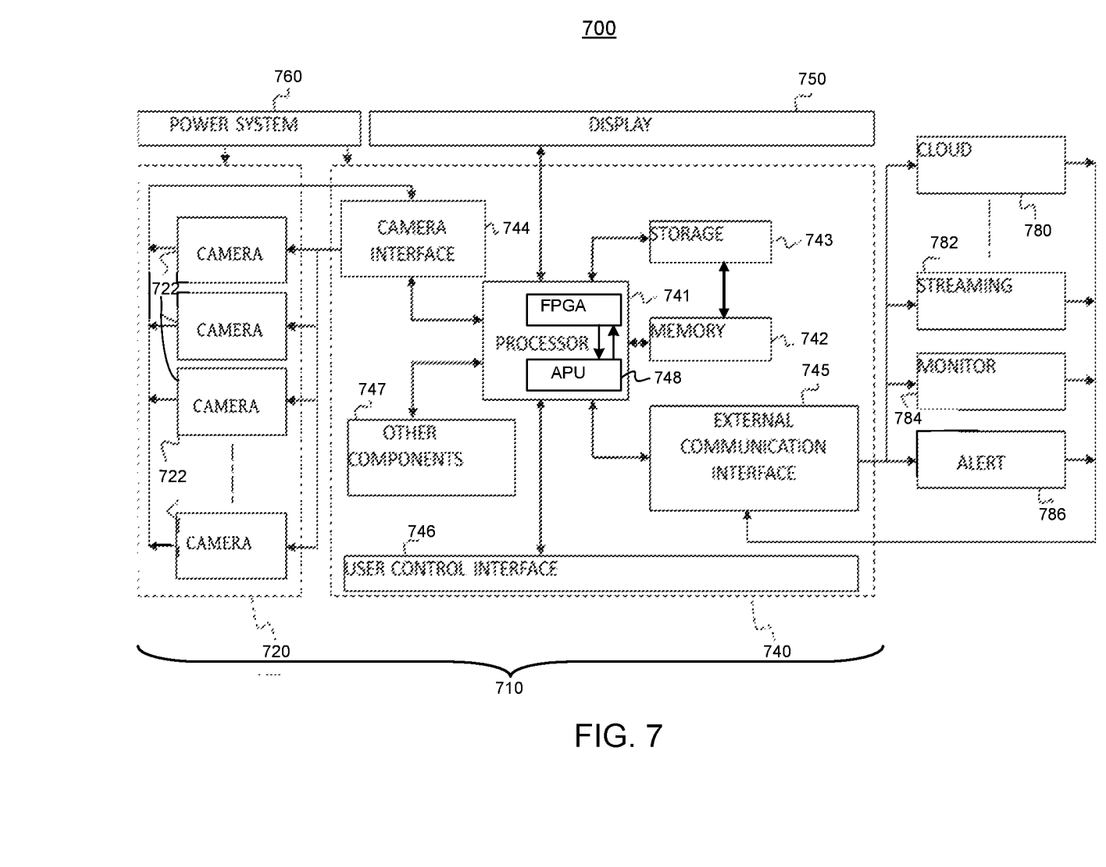
FIG. 7 conceptually illustrates an exemplary electronic system including a panoramic imaging system and various peripheral modules configured in an internet-enabled application environment with which some implementations of the subject technology can be implemented.

FIG. 7 conceptually illustrates an exemplary electronic system 700 including a panoramic imaging system 710 and various peripheral modules configured in an internet-enabled application environment with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

Exemplary panoramic imaging system 710 within exemplary panoramic imaging electronic system 700 may be implemented by panoramic imaging system 100 as described above with reference to FIG. 1. According to the present disclosure, the example panoramic imaging system 710 further includes an optical system 720 which includes a plurality of cameras 722, and a control system 740 that controls the functions of the optical system 720 and includes at least an image processing program to process image data output from optical system 720. The plurality of cameras 722 may be implemented by cameras 101-104 in system 100. However, the plurality of cameras 722 may include more or less cameras than cameras 101-104 in system 100.

Control system 740 described in FIG. 7 may be used to implement control system 110 described in FIG. 1. Particularly, the control system 740 includes at least a processor 741, a memory 742, a storage device 743, a camera interface 744, an external communication interface 745, and a user control interface 746. The control system 740 can be a general-purpose computer system such as a Personal Computer (PC), or preferably a custom-designed computing system. Particularly in some embodiments, the control system 740 is a system on chip (SOC); that is, an integrated circuit (IC) integrates all components and functions of the control system 740 into a single chip, which makes the present panoramic imaging system 710 portable and electronically durable as a mobile device. In some embodiments, the control system 740 may be located internally within a same housing where the optical system 720 is located. Alternatively, in other embodiments, the control system 740 is separated from the optical system 720 to allow end users' selection of different models of an optical system 720 to be used with the control system 740.

The storage device 743 is preloaded with at least the image processing programs of the present disclosure, including stereoscopic video image capturing and 3D video image playback programs. The stereoscopic video image capturing programs may include real-time parallax vector field generation programs described in more detail below. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 741 carries out instructions of the various algorithms. Thus, the various software programs, stored on the storage device 743 and executed in the memory 742 by the processor 741, direct the control system 740 to act in concert with the optical system 720 to perform various functions, which include but are not limited to receiving commands from an end user or an external device or service 780, 782, 784 and 786, defining the precise geometry of the cameras 722, commanding the cameras 722 to capture raw image data, tagging and storing raw data in a local storage device 743 and/or commuting raw data to an external device or service 780, 782, 784 and 786, detecting and adjusting the luminance levels of multiple channels of video signals from cameras 722 to enable the cameras 722 to capture the multiple channels of video images having substantially the same luminance level, presenting generated panoramas on a local display 750 and/or communicating generated panoramas to be stored or presented on an external device or service 780, 782, 784 and 786.

The processor 741 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 740 may employ a multi-core processor that has two or more CPUs or array processors that have multiple processors operating in parallel. In some embodiments, the processor 741 is an application specific integrated circuit (ASIC) that is designed for a particular use rather than for general purpose use. Particularly, in some embodiments, the processor 741 is a digital signal processor (DSP) designed for digital signal processing. More particularly, in some embodiments, the processor 741 is an on-chip image processor, specialized for image processing in a portable camera system. In some embodiments, the control system 740 includes a graphic processing unit (GPU), which has a massively parallel architecture consisting of thousands of smaller, more efficient cores designed for handling multiple tasks simultaneously. Particularly, in some embodiments, the control system 740 may implement GPU-accelerated computing, which offloads compute-intensive portions of an algorithm to the GPU while keeping the remainder of the algorithm to run on the CPU.

In particular embodiments, processor 741 of the present disclosure includes the proposed FPGA 410 described in conjunction with FIGS. 4-5. Hence, the FPGA 410 within processor 741 may be configured to adjust the luminance levels of multiple channels of video signals from cameras 722 to allow the set of cameras to capture the multiple channels of video images having substantially the same luminance level.

The memory 742 and the storage 743 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 240 is a single chip system, the memory 742 and storage 743 blocks are also integrated on-chip with the processor 741 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 741 retrieves instructions to execute and data to process in order to execute the processes of some implementations.

The camera interface 744 of the present disclosure can be any form of command and data interface usable with a camera 742, such as a digital. Exemplary embodiments include USB, FireWire and any other interface for command and data transfer that may be commercially available. Additionally, it is preferred, although not required, that the optical system 720 be equipped with a single digital control line that would allow a single digital signal to command all the cameras 722 simultaneously to capture an image of a scene and to acquire positional signals of the camera body.

The external communication interface 745 of the present disclosure can be any data communication interface, and may employ a wired, fiber-optic, wireless, or another method for connection with an external device or service 780, 782, 784 and 786. Ethernet, wireless-Ethernet, Bluetooth, USB, FireWire, USART, SPI are exemplary industry standards. In some embodiments, where the control system 740 is a single chip system, the external communication interface 745 is integrated on-chip with the processor 741 as well as other peripherals and interfaces.

The user control interface 746 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

Control system 740 of the present disclosure may further include other components 747 that facilitate its function. For example, control system 740 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. Control system 740 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. Control system 740 may optionally be equipped with a light sensor for environmental light conditions, so that control system 740 can automatically adjust hardware and/or software parameters of the system.

In some embodiments, the present electronic system 700 is further equipped with an internal power system 760 such as a battery or solar panel that supplies the electrical power. In other embodiments, electronic system 700 is supported by an external power source. In some embodiments, electronic system 700 is further equipped with a display 750, such that panoramic photos may be presented to a user instantly after image capture, and panoramic videos may be displayed to a user in real time as the scenes are being filmed.

In some embodiments, the present electronic system 700 may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 780, online video streaming and file sharing 782, remote surveillance 784, and alert 786 for home and public security.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. An integrated circuit (IC) chip implemented on a panoramic imaging system for adjusting luminance levels of a set of video signals captured by a set of cameras in the panoramic imaging system, the IC chip comprising:
    an input interface configured to receive a set of video images captured by the set of cameras;
    a set of luminance statistics modules coupled to the input interface and configured to generate a set of luminance histograms corresponding to the set of video images;
    an analysis module coupled to the set of luminance statistics modules and configured to generate a set of adjustment parameters indicative of operating settings of the set of cameras;
    a luminance uniformity adjustment module coupled to the analysis module and configured to process the adjustment parameters to generate a set of control parameters for adjusting the operating settings of the set of cameras; and
    a set of luminance control modules coupled to the luminance uniformity adjustment module and configured to use the set of control parameters to adjust the operating settings of the set of cameras, thereby enabling the set of cameras to capture a set of video signals having substantially the same luminance level.

2. The IC chip of claim 1, wherein the input interface is coupled to the set of cameras through a parallel YUV data path.

3. The IC chip of claim 1, wherein the set of luminance control modules is coupled to the set of cameras through an I²C bus.

4. The IC chip of claim 1, wherein the set of luminance control modules is implemented as an I²C master controller.

5. The IC chip of claim 1, wherein the set of control parameters includes at least a sensor gain.

6. The IC chip of claim 5, wherein the set of luminance control modules is configured to adjust the operating settings of the set of cameras by increasing the sensor gain for a camera in the set of cameras determined to have a lower lighting condition than other cameras in the set of cameras or decreasing the sensor gain for a camera in the set of cameras determined to have a higher lighting condition than other cameras in the set of cameras.

7. The IC chip of claim 1, wherein the IC chip further includes an output interface configured to output the set of video signals having substantially the same luminance level to an image processor in the panoramic imaging system for post-processing.

8. The IC chip of claim 1, wherein the IC chip includes a field-programmable gate array (FPGA).

9. A panoramic imaging system, comprising:
    a housing;
    a set of cameras;
    an integrated circuit (IC) chip coupled to the set of cameras and configured to adjust luminance levels of a set of video signals captured by the set of cameras, thereby enabling the set of cameras to capture the set of video signals having substantially the same luminance level;
    an image processor coupled to the IC chip and configured to receive the set of video signals having substantially the same luminance level and to post-process the set of video signals;
    an input interface configured to receive a set of video images captured by the set of cameras;
    a set of luminance statistics modules coupled to the input interface and configured to generate a set of luminance histograms corresponding to the set of video images;
    an analysis module coupled to the set of luminance statistics modules and configured to generate a set of adjustment parameters indicative of operating settings of the set of cameras;
    a luminance uniformity adjustment module coupled to the analysis module and configured to process the adjustment parameters to generate a set of control parameters for adjusting the operating settings of the set of cameras; and
    a set of luminance control modules coupled to the luminance uniformity adjustment module and configured to use the set of control parameters to adjust the operating settings of the set of cameras, thereby enabling the set of cameras to capture a set of video signals having substantially the same luminance level.

10. The panoramic imaging system of claim 9, wherein the input interface is coupled to the set of cameras through a parallel YUV data path.

11. The panoramic imaging system of claim 9, wherein the set of luminance control modules is coupled to the set of cameras through an I²C bus.

* * * * *